US012601175B2

(12) United States Patent
Oh et al.

(10) Patent No.:   US 12,601,175 B2
(45) Date of Patent:     Apr. 14, 2026

(54) TIMBER-CONCRETE COMPOSITE SLAB WITH NOTCHED PLYWOOD SHEAR CONNECTOR AND MANUFACTURING METHOD THEREOF

(71) Applicant: SEOUL NATIONAL UNIVERSITY R&DB FOUNDATION, Seoul (KR)

(72) Inventors: Jung Kwon Oh, Seoul (KR); Kyung Sun Ahn, Seoul (KR); Sung Jun Pang, Seoul (KR); Ji Yong Kim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 275 days.

(21) Appl. No.: 18/339,908

(22) Filed: Jun. 22, 2023

(65) Prior Publication Data

US 2023/0417052 A1     Dec. 28, 2023

(30) Foreign Application Priority Data

Jun. 24, 2022    (KR) ........................ 10-2022-0077492

(51) Int. Cl.
| | |
|---|---|
| *B32B 13/00* | (2006.01) |
| *B32B 3/30* | (2006.01) |
| *B32B 13/10* | (2006.01) |
| *E04B 5/43* | (2006.01) |

(52) U.S. Cl.
CPC ................. *E04B 5/43* (2013.01); *B32B 3/30* (2013.01); *B32B 13/10* (2013.01)

(58) Field of Classification Search
CPC ........ E04B 5/32; E04B 5/43; E04B 2005/324; E04B 5/326; B32B 3/30; B32B 13/10; B32B 13/00
See application file for complete search history.

(56) References Cited

U.S. PATENT DOCUMENTS

| | | | | |
|---|---|---|---|---|
| 7,577,832 | B2 * | 8/2009 | Wisecup ............... | G06F 9/4416 |
| | | | | 713/1 |
| 9,556,566 | B2 * | 1/2017 | Sanders .................... | E01C 5/06 |
| 9,920,490 | B2 * | 3/2018 | Sylvester ................. | E01C 5/08 |
| 10,006,174 | B2 * | 6/2018 | Ulislam ................. | E01C 23/10 |
| 10,094,101 | B1 * | 10/2018 | Jazzar ........................ | E04C 3/34 |
| 10,260,224 | B1 * | 4/2019 | Jazzar ....................... | E04B 5/04 |
| 11,401,707 | B2 * | 8/2022 | Zhou ....................... | E04B 1/043 |

(Continued)

FOREIGN PATENT DOCUMENTS

| | | |
|---|---|---|
| JP | 2012-241506 A | 12/2012 |
| JP | 2016-211327 A | 12/2016 |

(Continued)

*Primary Examiner* — Chi Q Nguyen
(74) *Attorney, Agent, or Firm* — Knobbe, Martens, Olson & Bear, LLP

(57) ABSTRACT

A timber-concrete composite slab with a notched plywood shear connector may include a plurality of shear connectors disposed with gaps in a width direction, and a plurality of tension members made of wood and each coupled to lower portions of any one and another adjacent one of the shear connectors between the adjacent shear connectors. The timber-concrete composite slab may also include a plurality of heat insulators each bonded or inserted between upper portions of any one and another adjacent one of the shear connectors, and concrete poured in a predetermined height over the shear connectors.

10 Claims, 11 Drawing Sheets

A

(56) References Cited

U.S. PATENT DOCUMENTS

| 11,479,960 B1 * | 10/2022 | Weller | .................... | E04B 1/043 |
| 11,802,403 B2 * | 10/2023 | Argyrou | .................. | E04G 11/48 |
| 2014/0013699 A1 * | 1/2014 | Gallinat | .................... | E04B 2/62 |
| | | | | 52/583.1 |

FOREIGN PATENT DOCUMENTS

| KR | 10-2007-0062747 A | 6/2007 |
| KR | 10-1615976 B1 | 4/2016 |
| KR | 10-2022-0074078 A | 6/2022 |

* cited by examiner

A

A

| NOTCHED PORTION FORMING STEP | —S1 |
| SHEAR CONNECTOR FORMING STEP | —S2 |
| TENSION MEMBER COUPLING STEP | —S3 |
| HEAT INSULATOR COUPLING STEP | —S4 |
| SHEAR CONNECTOR CONNECTING STEP | —S5 |
| CONCRETE POURING STEP | —S6 |

TIMBER-CONCRETE COMPOSITE SLAB WITH NOTCHED PLYWOOD SHEAR CONNECTOR AND MANUFACTURING METHOD THEREOF

CROSS REFERENCE TO RELATED APPLICATION

The present application claims priority to Korean Patent Application No. 10-2022-0077492, filed Jun. 24, 2022, the entire contents of which are incorporated herein for all purposes by this reference.

BACKGROUND

Technical Field

The present disclosure relates to a timber-concrete composite slab and, more particularly, a timber-concrete composite slab with a notched plywood shear connector, the timber-concrete composite slab enabling stable connection of timber and concrete, making it possible to minimize consumption of timber, and making it possible to minimize time that is taken to process timber, and a method of manufacturing the timber-concrete composite slab.

Description of Related Technology

The floor or roof of architectural structures can be formed using slabs.

SUMMARY

One aspect is a timber-concrete composite slab in which timber and concrete can be stably connected and that makes it possible to minimize consumption of timber and minimize the time that is taken to process timber, and a method of manufacturing the timber-composite slab.

Another aspect is a timber-concrete composite slab with a notched plywood shear connector, the timber-concrete composite slab including: a plurality of shear connectors each formed by longitudinally connecting a plurality of plywood sections each of which has a notched portion on an upper end; a plurality of tension members made of wood and each coupled to lower portions of any one and another adjacent one of the shear connectors between the adjacent shear connectors; a plurality of heat insulators each coupled to upper portions of any one and another adjacent one of the shear connectors between the adjacent shear connectors; and concrete poured in a predetermined height over the shear connectors.

The notched portions may be formed by partially cutting upper ends of the plywood sections.

The shear connectors each may have a fireproof paint layer applied in a predetermined thickness on an outer edge face of a lower end thereof.

The shear connectors each may have a waterproof paint layer applied in a predetermined thickness on an outer edge face of an upper end thereof.

The tension members may be coupled respectively to the plywood sections constituting the shear connectors.

The heat insulators each may be coupled to upper portions of any one and another adjacent one of the shear connectors between the adjacent shear connectors by bonding or inserting.

The timber-concrete composite slab may further include a protruding member passing through at least one position of the upper end of each of the shear connectors.

In order to achieve the objectives, another aspect of the present disclosure provides a method of manufacturing the timber-concrete composite slab with a notched plywood shear connector, the method including: a notched portion forming step of forming a notched portion by partially cutting each of a plurality of plywood sections; a shear connector forming step of forming a shear connector by longitudinally arranging the plurality of plywood sections having the notched portions formed thereon; a tension member coupling step of coupling a plate-shaped wood tension member having a predetermined height to the shear connector by butting and the nailing the tension member to a lower portion of a first side of the shear connector; a heat insulator coupling step of coupling an heat insulator having a predetermined height to the shear connector by joining and then fixing the heat insulator to an upper portion of a first side of the shear connector having the tension member fixed thereto; a shear connector connection step of connecting shear connectors in a preset width by joining and then nailing a shear connector to the shear connector having the heat insulator coupled thereto; and a concrete pouring step of pouring concrete over the shear connectors connected in the preset width.

The concrete in the concrete pouring step may be poured with the shear connectors, which have been connected in a preset width, placed in a mold at the manufacturing site.

The concrete in the concrete pouring step may be poured with the shear connectors, which have been connected in a preset width, installed and fixed between any one wall or beam and another wall or beam of an architectural structure.

According to the timber-concrete composite slab with a notched plywood shear connector of the present disclosure, a notched portion is formed at the upper end of each of plywood sections constituting a shear connector, concrete poured over the shear connectors hardens partially in the notched portions, so the concrete and the notched portions are fitted to each other, whereby the shear connectors and the concrete can be stably connected.

According to the timber-concrete composite slab with a notched plywood shear connector of the present disclosure, a shear connector is formed by connecting a plurality of plywood sections and the shear connectors are disposed with gaps in the width direction, so it is possible to minimize consumption of timber in comparison to the method of forming notches by cutting timber in the related art.

According to the timber-concrete composite slab with a notched plywood shear connector of the present disclosure, notched portions are formed by partially cutting plywood sections, so notched portions can be simply formed, whereby consumption of time and manpower for forming notched portions can be minimized.

According to the timber-concrete composite slab with a notched plywood shear connector of the present disclosure, a wood tension member is coupled to lower portions of any one shear connector and another one shear connector disposed with gaps in the width direction between the shear connectors, so it is possible to adjust the performance of the slab by increasing or decreasing the height of the notched plywood shear connectors.

According to the timber-concrete composite slab with a notched plywood shear connector of the present disclosure, a heat insulator is coupled to upper portions of any one shear connector and another one shear connector disposed with gaps in the width direction between the shear connectors, it is possible to keep the height of concrete substantially uniform and it is also possible to distribute wires for electricity or communication through holes formed through the heat insulators.

DETAILED DESCRIPTION

Figure 1:
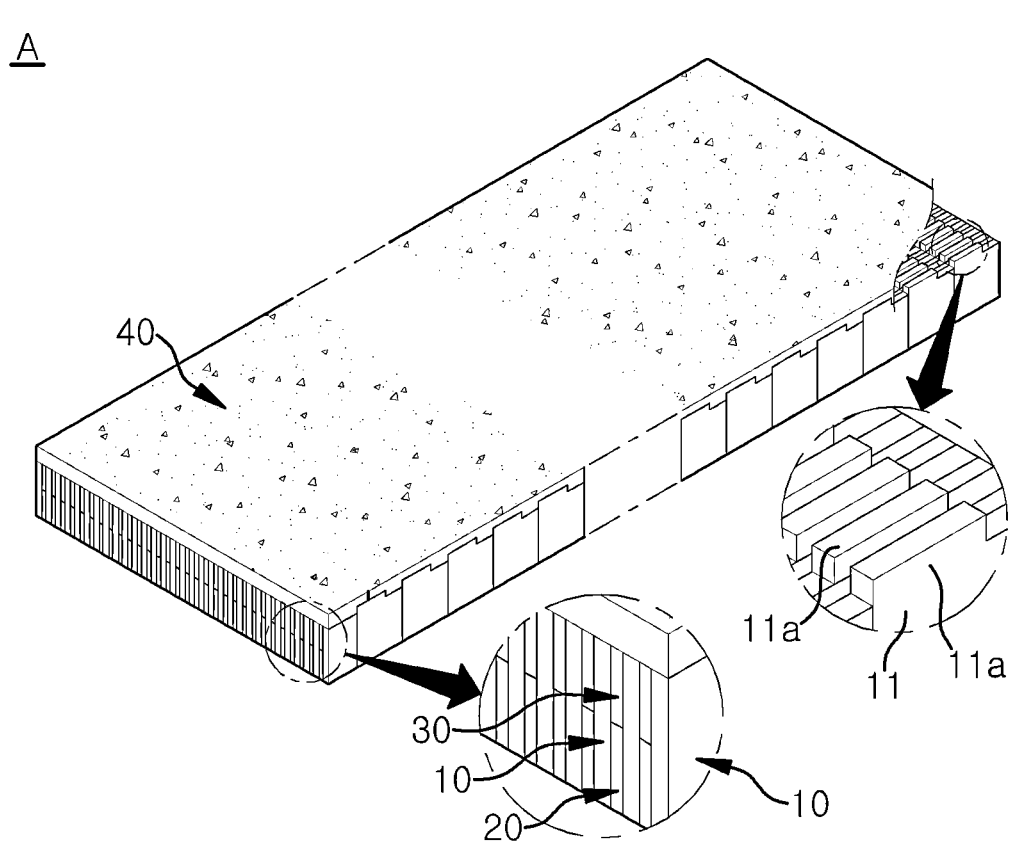
FIG. 1 is a perspective view showing the external shape of a timber-concrete composite slab with a notched plywood shear connector according to the present disclosure.

A modular construction method of manufacturing materials through pre-fabrication and assembling the materials at the site is recently on the rise, and it is possible to achieve active effects such as uniformity of the quality, construction period reduction, and cost reduction through pre-fabrication of building components such as a beam, a column, and a slab.

A slab of such construction materials is manufactured using wood or reinforced concrete (RC).

However, concrete enables manufacturing with large spans due to high rigidity, but has a defect that it is heavy and the curing period is long.

As for a wooden slab, lifting is easy because the weight is small and the entire construction period can be reduced because the manufacturing period is short, but there is a problem that it is difficult to satisfy deflection limits due to low flexural rigidity and it is vulnerable to vibration and noise.

In order to solve these problems, as disclosed in Korean Patent No. 10-1615976, etc., a 'timber-concrete composite slab' is increasingly used.

A timber-concrete composite slab is formed by connecting timber and concrete, in which the concrete resists compressive stress and the timber resists tensile stress, whereby stable flexural strength can be secured.

However, timber and concrete are connected through shear connectors designed in various types in composite slabs, and when connection of the shear connectors is unstable, desired structural performance cannot be achieved.

For this reason, it is being attempted to stably connect timber and concrete in various ways in the field.

Meanwhile, one of the methods of stably connecting timber and concrete is a method of forming notches by grooving timber.

When concrete is poured over notches formed on timber, the concrete become connected with the notches by curing process However, since it is required to groove timber with tools such as a chisel in order to form notches on the timber, there is a problem that not only it takes considerable time and manpower to form notches, but a portion of timber is removed due to formation of notches, so the structural performance, for example, flexural rigidity is deteriorated. In particular, there is a problem that since solid timber is used, consumption of timber increases.

A method of putting metallic parts such as nails or metal meshes between timber and concrete has been proposed to solve these problems.

When metal parts are disposed between timber and concrete, the concrete poured over the timber hardens while covering the metal parts, so the timber and the concrete can be stably connected.

However, when metal parts are disposed between timber and concrete, there is a problem that it not only costs much to prepare the metal part, but it takes considerable time and manpower installing the metal parts. In particular, there is a problem that the connection force between timber and concrete decreases in comparison to forming notches on timber.

For this reason, it has been attempted in the field to develop a timber-concrete composite slab in which timber and concrete can be stably connected and that makes it possible to minimize consumption of timber, minimize the time that is taken to process timber, and improve flexural rigidity at the timber portion, but there is no satisfactory result up to now.

Hereinafter, the present disclosure is described in detail on the basis of the accompanying drawings.

Figure 2:
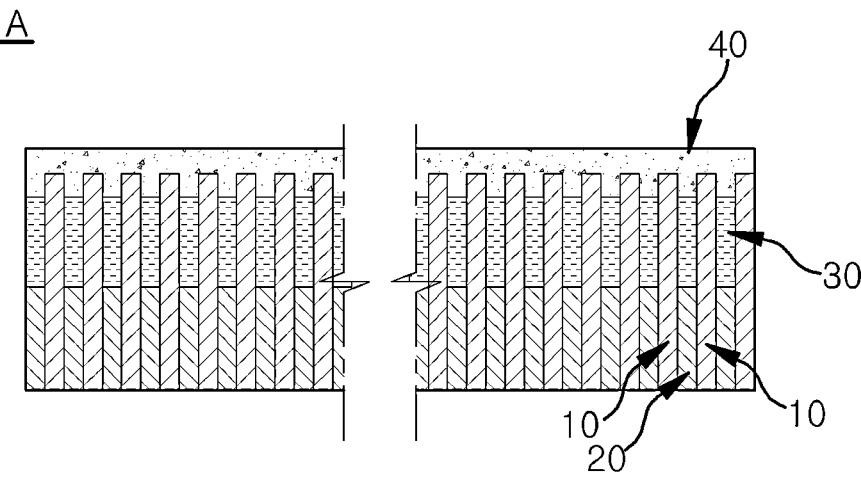
FIG. 2 is a one-directional cross-sectional view illustrating the timber-concrete composite slab with a notched plywood shear connector according to the present disclosure.

As shown in FIGS. 1 and 2, a timber-concrete composite slab A with a notched plywood shear connector according to the present disclosure (hereafter, a composite slab according to the present disclosure) includes a shear connector 10, a tension member 20, a heat insulator 30, and concrete 40.

The shear connector 10 of the present disclosure is formed by longitudinally connecting a plurality of plywood sections each having a notched portion 11a on the upper end, and a plurality of shear connectors 10 is provided and disposed with gaps in the width direction.

The notched portion 11a may be formed by cutting the upper end of a plywood section 11 in preset width and depth.

Meanwhile, the shear connector 10 includes a fireproof paint layer 12 applied in a predetermined thickness on the outer edge face of the lower end, whereby damage due to a fire can be minimized by the fireproof paint layer 12.

The shear connector 10 further includes a waterproof paint layer 13 applied in a predetermined thickness on the outer edge face of the upper end, whereby inflow of water when the concrete 40 is poured over the shear connector 10 can be prevented.

A plurality of tension members 20 is provided in the present disclosure, and a tension member 20 is coupled to lower portions of any one shear connector 10 and another adjacent shear connector 10 therebetween.

The tension member 20 is timber, so not only flexural strength can be improved, but it can be simply coupled to the shear connector 10 by nailing.

Nails N not only couple a tension member 20 to a shear connector 10, but connect any one shear connector 10 and another shear connector 10.

A plurality of heat insulators 30 is provided in the present disclosure, and a tension member 20 is bonded to the upper portions of any one shear connector 10 and another adjacent shear connector 10 therebetween or inserted between the upper portions.

The heat insulator 30 may be any of common types as long as they can achieve a heat insulation effect, and as an example, it may be a bead heat insulator.

The concrete 40 of the present disclosure is poured in a predetermined height over the shear connectors 10.

When the height h2 of the concrete is less than 150% of the depth d of the notched portion, the composite effect between the concrete and the shear connectors 10 may be insufficient, and when the height h2 of the concrete exceeds 300% of the depth d of the notched portion, a neutral axis is formed in the layer of the concrete 40, so the flexural performance may be greatly deteriorated. Accordingly, the height h2 of the concrete may be 150-300% of the depth d of the notched portion.

The composite slab A according to the present disclosure may further include protruding members 50.

The protrusion members 50 protrude from the edge faces of the upper ends of the shear connectors 10, so when the concrete 40 is poured over the shear connectors 10, the concrete 40 covers the protruding members 50, whereby as the concrete 40 hardens, the shear connectors 10 and the concrete 40 can be more stably connected.

Figure 3:
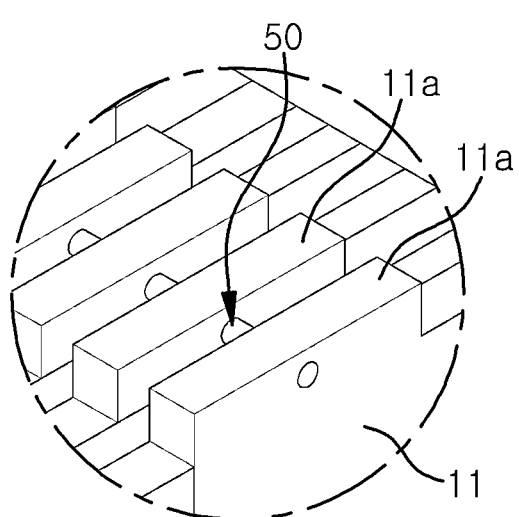
FIG. 3 is an exemplary view showing the type in which the timber-concrete composite slab with a notched plywood shear connector according to the present disclosure includes a protruding member.

The protruding member 50, as shown in FIG. 3, is formed in a rod shape and can pass through at least one point of the upper end of each of the shear connectors 10, but the present disclosure is not limited thereto.

That is, the protrusion 50 may be formed like a screw and may be fastened to protrude upward from at least one point of the upper end of each of the shear connectors 10.

Figure 4:
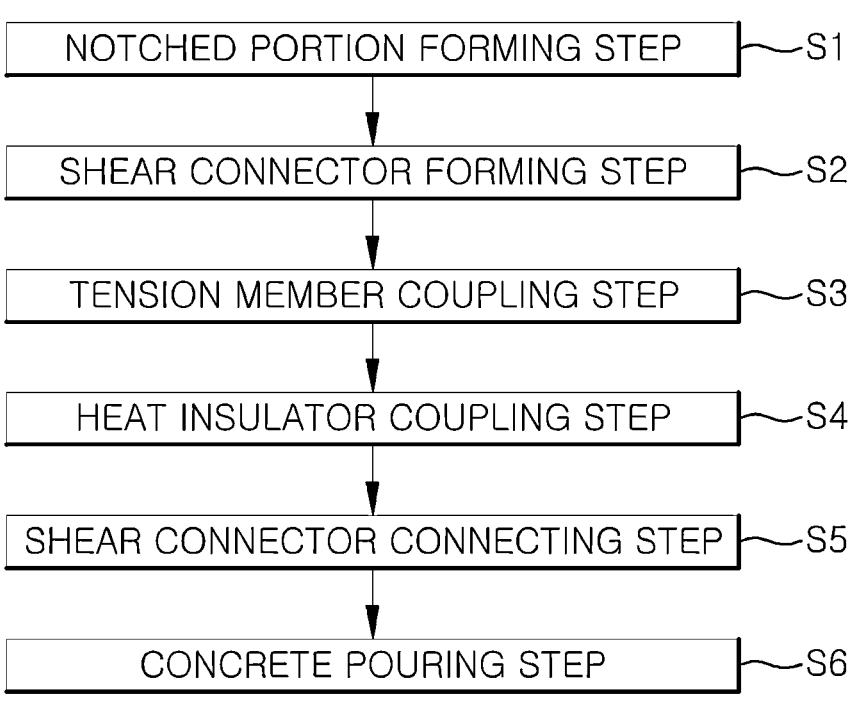
FIG. 4 is a schematic process chart of a method of manufacturing the timber-concrete composite slab with a notched plywood shear connector according to the present disclosure.

Meanwhile, as shown in FIG. 4, a method of manufacturing the timber-concrete composite slab with a notched plywood shear connector according to the present disclosure includes a notched portion forming step (S1); a shear connector forming step (S2), a tension member coupling step (S3), a heat insulator coupling step (S4), a shear connector connecting step (S5), and a concrete pouring step (S6).

Figure 5:
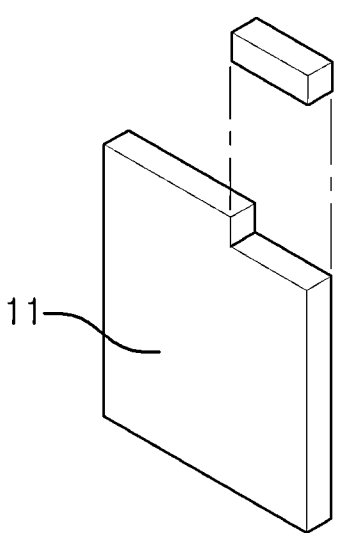
FIG. 5 is an exemplary view illustrating a notch forming step of the method of manufacturing the timber-concrete composite slab with a notched plywood shear connector according to the present disclosure.

The notched portion forming step (S1) of the present disclosure, as shown in FIG. 5, forms notched portion 11a by partially cutting each of a plurality of plywood sections 11 having the same dimensions in the same width and depth.

Figure 6:
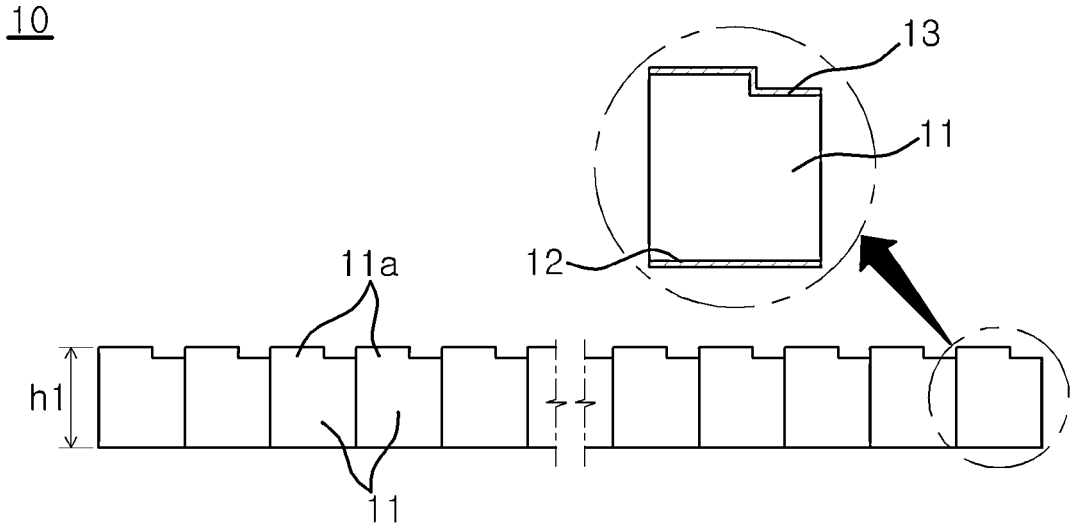
FIG. 6 is an exemplary view illustrating a shear connector forming step of the method of manufacturing the timber-concrete composite slab with a notched plywood shear connector according to the present disclosure.

The shear connector forming step (S2) of the present disclosure, as shown in FIG. 6, forms a shear connector 10 by longitudinally arranging a plurality of plywood sections 11 having the notched portions 11a formed thereon.

In this case, a plurality of plywood sections 11 is arranged in a preset length, whereby the shear connector 10 has a preset length.

Figure 7:
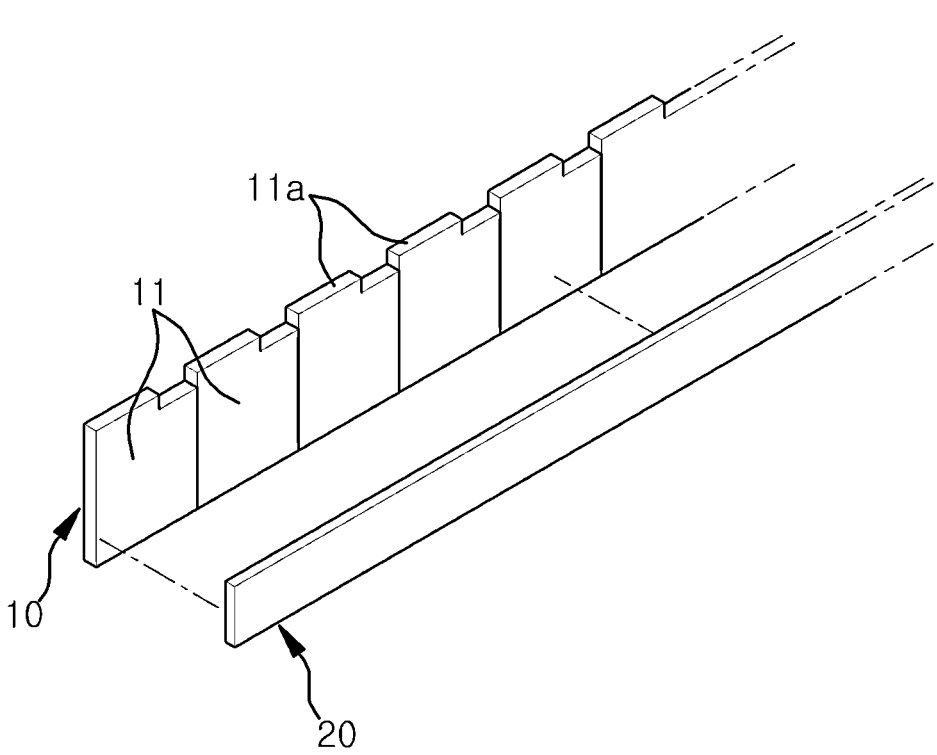
FIG. 7 is an exemplary view illustrating a tension member coupling step of the method of manufacturing the timber-concrete composite slab with a notched plywood shear connector according to the present disclosure.

The tension member coupling step (S3) of the present disclosure, as shown in FIG. 7, butts and then nails a wood tension member 20 having a predetermined height to the lower portion of a first side of the shear connector 10, thereby coupling the tension member 20 to the shear connector 10.

In this case, at least two or more nails N connecting the tension member 20 and the shear connector 10 are driven into each of the plywood sections 11 forming the shear connector 10, whereby separation of the plywood sections 11 can be prevented.

Figure 8:
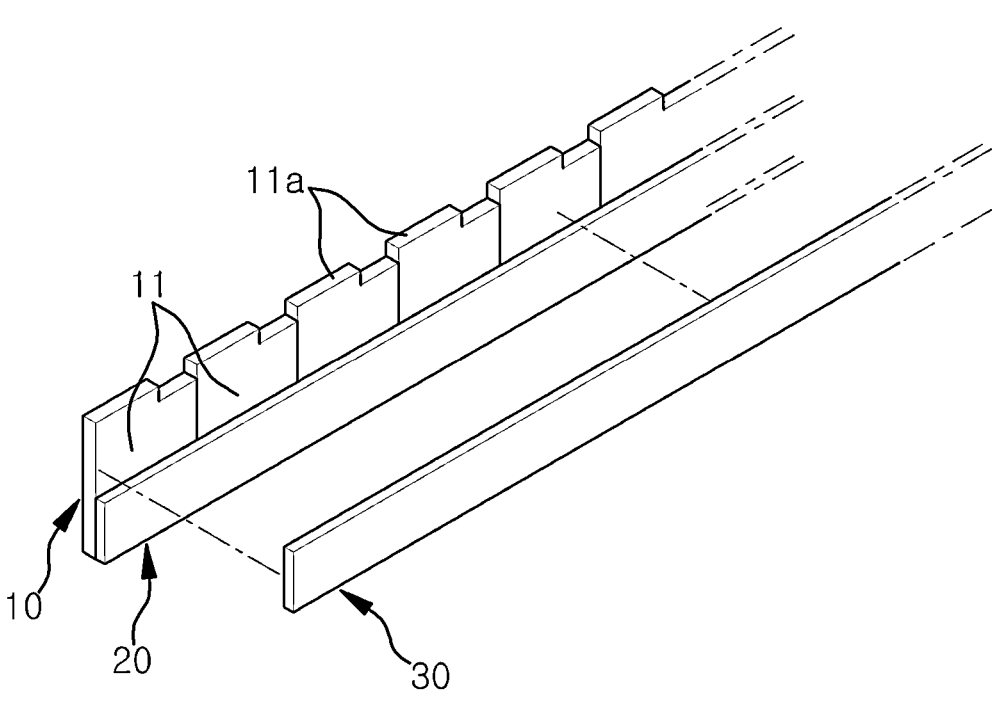
FIG. 8 is an exemplary view illustrating a heat insulator coupling step of the method of manufacturing the timber-concrete composite slab with a notched plywood shear connector according to the present disclosure.

The heat insulator coupling step (S4) of the present disclosure, as shown in FIG. 8, joins a heat insulator 30 having a predetermined length to the upper portion of the first side of the shear connector 10 fixed to the tension member 20, thereby coupling the heat insulator 30 to the shear connector 10.

In this case, the heat insulator 30 is bonded to the upper portion of the first side of the shear connector 10 or is inserted between the upper portion of any one shear connector 10 and the upper portion of another shear connector 10, whereby the heat insulator 30 can be fixed at the position.

Figure 9:
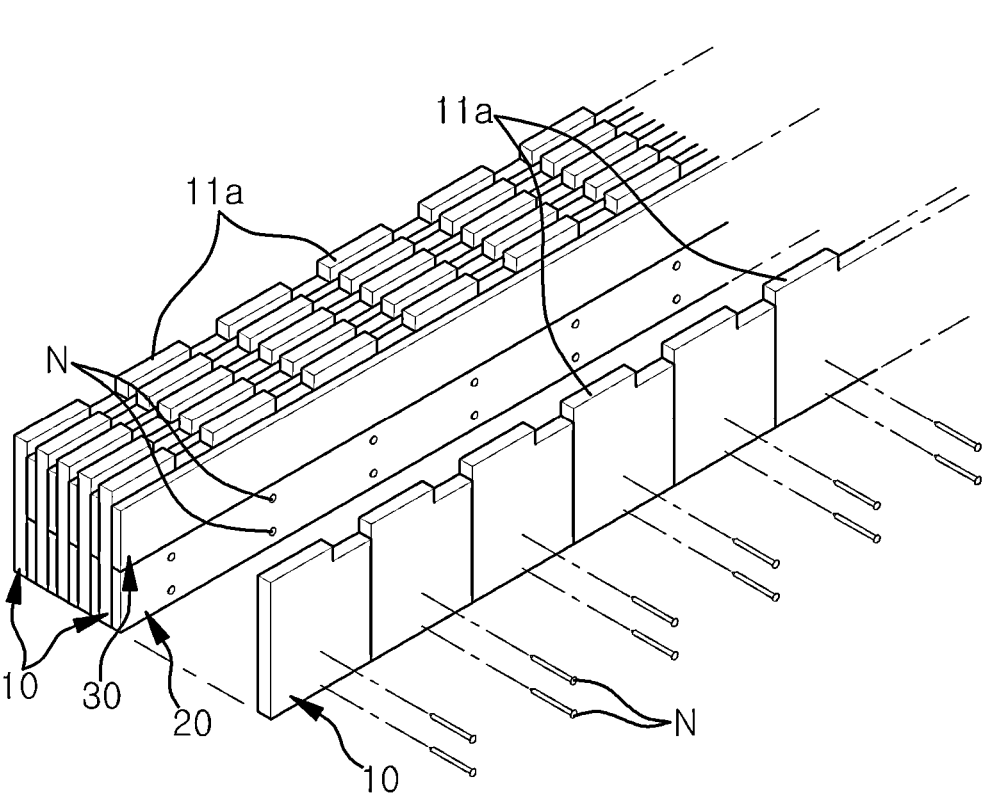
FIG. 9 is an exemplary view illustrating a shear connector connecting step of the method of manufacturing the timber-concrete composite slab with a notched plywood shear connector according to the present disclosure.

The shear connector connection step (S5) of the present disclosure, as shown in FIG. 9, another shear connector 10 is joined and then nailed to the shear connector 10 having the heat insulator 30 joined thereto, whereby they are connected to each other.

In this case, the shear connectors 10 are connected in a preset width, whereby the composite slab A according to the present disclosure has a preset width.

The concrete pouring step (S6) of the present disclosure pours concrete 40 over the shear connectors 10 connected in a preset width.

In this case, the height h2 of the concrete may be 150~300% of the depth d of the notched portion.

Figure 10:
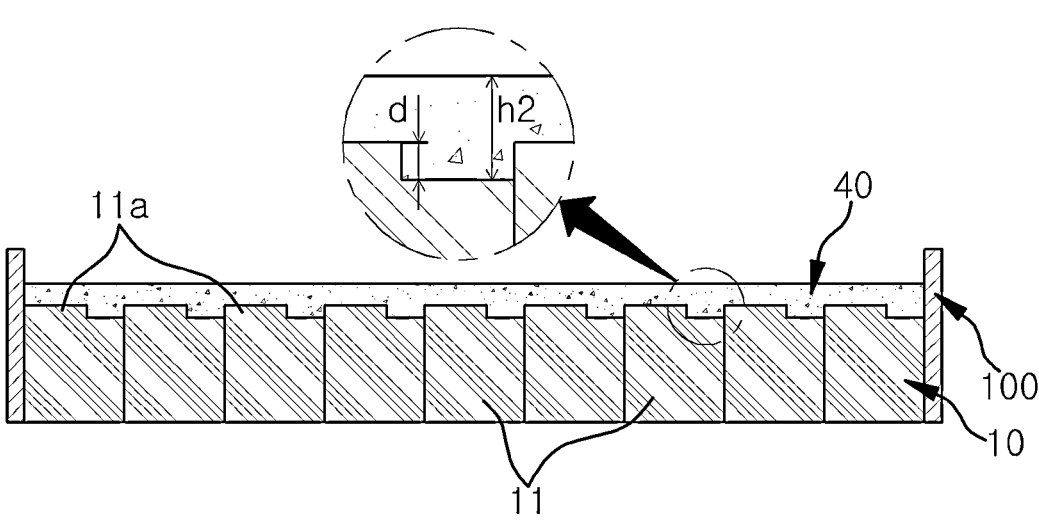
FIG. 10 is an exemplary view illustrating a concrete pouring step of the method of manufacturing the timber-concrete composite slab with a notched plywood shear connector according to the present disclosure.

Meanwhile, in the concrete pouring step (S6), the concrete 40, as shown in FIG. 10, may be poured with shear connectors 10, which have been connected in a preset width, placed in a mold at the manufacturing site of the composite slab A according to the present disclosure, but the present disclosure is not limited thereto.

Figure 11:
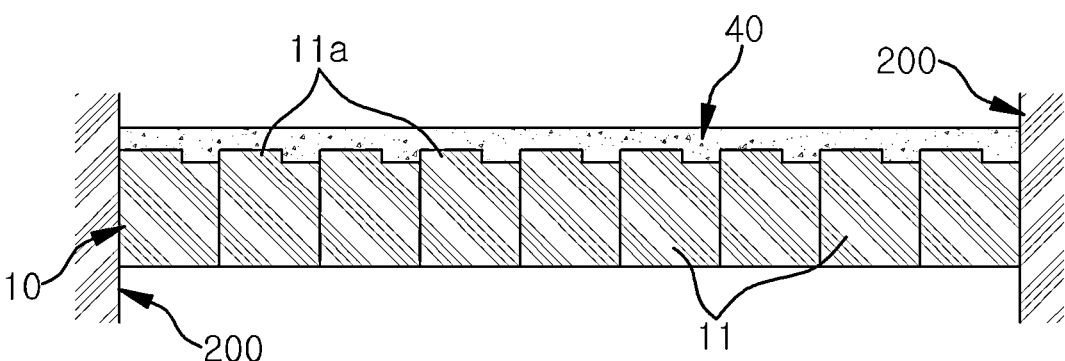
FIG. 11 is another exemplary view illustrating the concrete pouring step of the method of manufacturing the timber-concrete composite slab with a notched plywood shear connector according to the present disclosure.

That is, in the concrete pouring step (S6), the concrete 40, as shown in FIG. 11, may be poured with shear connectors 10, which have been connected in a preset width, installed and fixed between any one wall or beam 200 and another wall or beam 200 of an architectural structure at the construction site of the composite slab A according to the present disclosure.

The shear connectors 10 and the concrete 40 can be stably connected in the composite slab A according to the present disclosure.

This configuration is described in detail hereafter.

In the present disclosure, the notched portion 11a is formed at the upper end of each of a plurality of plywood sections 11 forming the shear connector 10, and the concrete that is poured over the shear connector 10 hardens partially in the notched portion 11a formed on each of the plywood sections 11, whereby the shear connectors 10 and the concrete can be stably connected and the structural strength can be improved.

The notched portions 11a are formed by partially cutting the plywood sections 11, so the notched portions 11 can be formed simply in comparison to forming notched portions by partially grooving solid timber with a chisel, whereby not only consumption of the time and manpower for cutting the notched portions 11a can be minimized, but consumption of timber can be minimized.

The present disclosure may further include a protruding member 50 passing through at least one point of the upper end of each of the shear connectors 10, so the concrete hardens over the shear connectors 10 while covering the protruding member 50, whereby the shear connectors 10 and the concrete 40 can be more stably connected and the structural strength can be further improved.

Further, the flexural performance of the composite slab A according to the present disclosure can be adjusted by adjusting the height of the shear connectors 10.

That is, the present disclosure includes wood tension members 20 each coupled to the lower portions of any one shear connector 10 and another shear connector 10 disposed with a gap in the width direction, so it is possible to adjust the flexural performance of the wood tension members 20 by increasing or decreasing the height h1 of the shear connectors 10 combined with the wood tension members 20.

Since the tension members 20 can be simply coupled to the shear connectors 10 by nailing, consumption of the time and manpower for coupling the tension members 20 and the shear connectors 10 can be minimized.

Further, the timber-concrete composite slab A with a notched plywood shear connector according to the present disclosure can have heat insulation performance.

That is, since the present disclosure includes insulators 30 each coupled to the upper portions of any one shear connector 10 and another shear connector 10 disposed with a gap in the width direction, heat insulation can be achieved by the heat insulators 30, whereby heating efficiency can be improved by the heat insulators 30 blocking inter-layer heat transfer. Further, by forming holes through the heat insulators 30, it is possible to distribute wires for electricity and communication in a corresponding area through the holes.

The heat insulators 30 prevents the concrete 30 that is poured over the shear connectors 10 from flowing in between the shear connectors 10, so the height of the concrete 40 can be substantially uniform, whereby consumption of the concrete 40 can be minimized and an aesthetic external appearance can be achieved.

Meanwhile, in the present disclosure, the concrete 40 not only can be poured with shear connectors 10, which have been connected in a preset width, placed in a mold at the manufacturing site of the composite slab A according to the present disclosure, but can be poured with shear connectors 10, which have been connected in a preset width, installed and fixed between any one wall or beam 200 and another wall or beam 200 of an architectural structure at the construction site of the composite slab A according to the present disclosure. Accordingly, pre-fabricated products can be supplied when the concrete 40 is poured at a manufacturing site, and products can be easily carried when the concrete 40 is poured at a construction site.

TEST EXAMPLE 1

The timber-concrete composite slab with a notched plywood shear connector according to the present disclosure were manufactured in two dimensions (A: 288×330×6210/ B: 288×245×6210 (width×height×length, unit: mm), flexural strength (moment resistance)/effective flexural rigidity was measured by performing a four-point bending test on ten pieces for each dimensions, and the measurement values were compared with prediction values through Gamma method, and the comparison result was shown in the following Table 1.

TABLE 1

| Specimen | $M_{max}$ (N · mm) | | $EI_{ef}$ (N · mm²) | |
| | Prediction | Measurement | Prediction | Measurement |
| --- | --- | --- | --- | --- |
| A | $4.21 \times 10^7$ | $4.04 \times 10^7$ | $0.86 \times 10^{13}$ | $1.17 \times 10^{13}$ |
| B | $1.45 \times 10^7$ | $1.26 \times 10^7$ | $0.26 \times 10^{13}$ | $0.37 \times 10^{13}$ |

It can be seen in Table 1 that the measurement values are smaller than the prediction values, but the differences are around 10%, and the measurement values are larger than the prediction values in terms of effective flexural rigidity.

Accordingly, it can be seen that it is possible to improve flexural strength through the composite slab A according to the present disclosure.

Since the present disclosure described above is not limited to the embodiment described above, the present disclosure may be changed without departing from the spirit described in following claims and such change is included in the protection range of the present disclosure defined in the claims.

What is claimed is:

1. A timber-concrete composite slab with a notched plywood shear connector, the timber-concrete composite slab comprising:
   a plurality of shear connectors, each of the plurality of shear connectors formed by longitudinally connecting a plurality of plywood sections, wherein each of the plurality of plywood sections has a notched portion on an upper end;
   a plurality of tension members made of wood, each of the plurality of tension members coupled to lower portions of any one of the plurality of shear connectors and another adjacent one of the plurality of shear connectors between the adjacent shear connectors;
   a plurality of heat insulators, each of the plurality of heat insulators coupled to upper portions of any one of the plurality of shear connectors and another adjacent one of the plurality of shear connectors between the adjacent shear connectors; and
   concrete poured in a predetermined height over the shear connectors.

2. The timber-concrete composite slab of claim 1, wherein the notched portions are configured to be formed by partially cutting upper ends of the plywood sections.

3. The timber-concrete composite slab of claim 1, wherein each of the shear connectors has a fireproof paint layer applied in a predetermined thickness on an outer edge face of a lower end thereof.

4. The timber-concrete composite slab of claim 1, wherein each of the shear connectors has a waterproof paint layer applied in a predetermined thickness on an outer edge face of an upper end thereof.

5. The timber-concrete composite slab of claim 1, wherein the tension members are coupled respectively to the plywood sections constituting the shear connectors.

6. The timber-concrete composite slab of claim 1, wherein each of the heat insulators is coupled to upper portions of any one of the plurality of shear connectors and another adjacent one of the plurality of shear connectors between the adjacent shear connectors by bonding or inserting.

7. The timber-concrete composite slab of claim 6, wherein each of the heat insulators comprises holes, and wires for electricity and communication are distributed in a corresponding area through the holes.

8. A method of manufacturing a timber-concrete composite slab with a notched plywood shear connector, the method comprising:

forming a notched portion by partially cutting each of a plurality of plywood sections having identical dimensions in width and depth;

forming a shear connector by longitudinally arranging the plurality of plywood sections having the notched portions formed thereon;

coupling a wood tension member having a predetermined height to the shear connector by butting and the nailing the tension member to a lower portion of a first side of the shear connector;

coupling an heat insulator having a predetermined height to the shear connector by joining and then fixing the heat insulator to an upper portion of a first side of the shear connector having the tension member fixed thereto;

connecting shear connectors in a preset width by joining and then nailing a shear connector to the shear connector having the heat insulator coupled thereto; and pouring concrete over the shear connectors connected in the preset width.

9. The method of claim 8, wherein the concrete is poured with the shear connectors, and wherein the shear connectors have been connected in a preset width, placed in a mold.

10. The method of claim 8, wherein the concrete is poured with the shear connectors, and wherein the shear connectors have been connected in a preset width, installed and fixed between any one wall or beam of an architectural structure and another wall or beam of the architectural structure.

* * * * *